Jan. 16, 1962 — M. L. RITCHIE — 3,017,609
DRAG INDICATOR FOR AIRCRAFT COCKPITS
Filed June 24, 1958 — 2 Sheets-Sheet 1

INVENTOR.
MALCOLM L. RITCHIE
BY
ATTORNEYS

FIG. 4
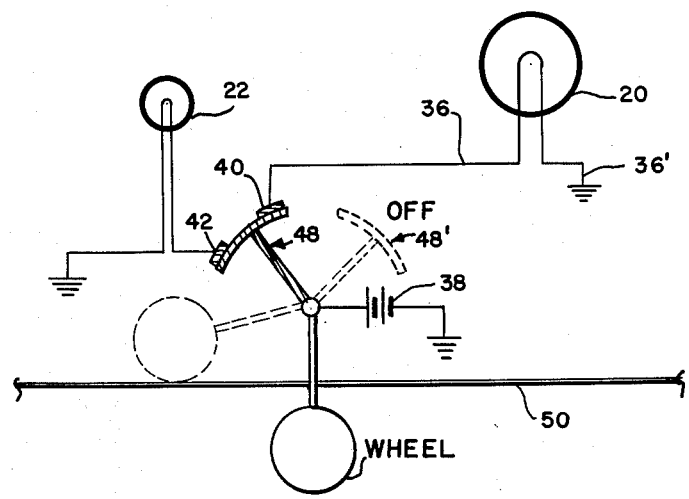
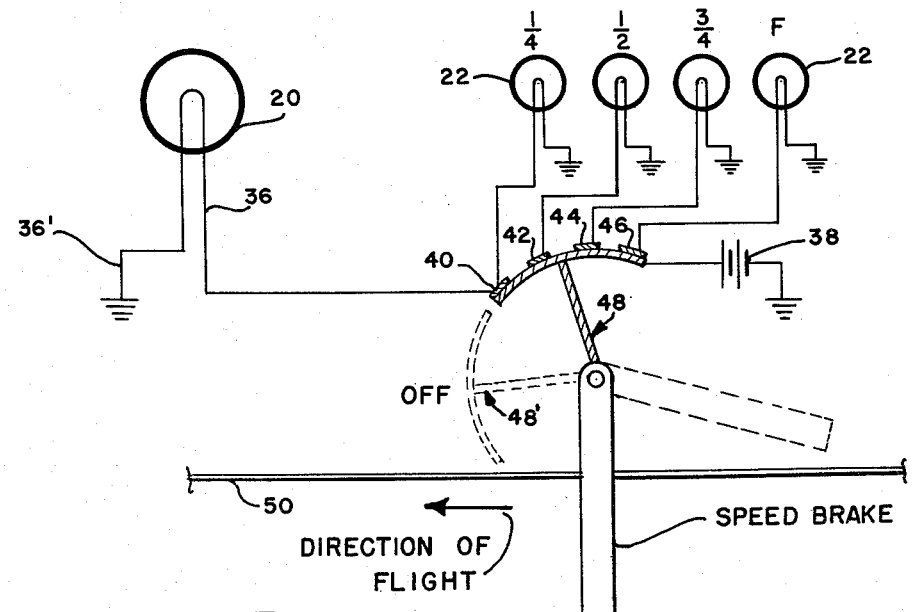
FIG. 5
INVENTOR.
MALCOLM L. RITCHIE
BY Wade Koontz
ATTORNEY

United States Patent Office 3,017,609
Patented Jan. 16, 1962

3,017,609
DRAG INDICATOR FOR AIRCRAFT COCKPITS
Malcolm L. Ritchie, Dayton, Ohio, assignor to the United States of America as represented by the Secretary of the Air Force
Filed June 24, 1958, Ser. No. 744,301
3 Claims. (Cl. 340—27)

This invention relates to drag indicators for installation in instrument panels of aircraft. As illustrated, the invention combines into one display indicators for several controlled drag elements which project into the air-stream, such as flaps, wheels, drag chute, etc. The display is so arranged that the criterion air speed for operation of each of these controlled drag elements appears immediately below a picture of that element in association with an indicator showing the air speed of the plane. This concentration of indicators showing the condition and position of the drag elements is particularly useful when landing and the association of pictures of the drag elements with the indicated speed and the criterion speed for operation of the controls is a visual and constant reminder to the pilot of the proper sequence and timing of each operation.

The present practice is to locate the indicators for drag elements at the switch controlling the element and they may be at various places on the cockpit panel remote from the air speed indicator. The pilot must memorize the sequence of operations, the criterion speed for the operation of each drag element, and watch the air speed indicator. If a drag element is let down into the airstream at excessive speed structural damage to the plane may result.

It is an object of this invention to group all drag element indicators into a small subpanel associated with an air speed indicator on which the criterion speed for the operation of each drag element is indicated.

It is a further object of this invention to group all drag element indicators in a conveniently located subpanel containing a picture of each drag element with the criterion speed for the operation of each element indicated on an air speed indicator associated with the group.

The invention consists essentially of a case with a translucent window. Behind the window, in separate compartments, are images of the drag elements to be controlled which appear as silhouettes when electric bulbs behind them light as the element controls are operated. Above the compartments containing silhouettes of the drag elements, are smaller compartments showing the condition of the elements, such as "safe" for the wheels when they are down and locked, "¼," "½," etc. for flaps showing how far they are down, etc.

In the drawings:

FIGURE 4 is a schematic drawing showing how the lowering of a wheel operates a switch to successively light two electric bulbs; and FIGURE 5 is a schematic drawing showing how the lowering of a speed brake operates a switch to light four electric bulbs in succession.

Figure 1:
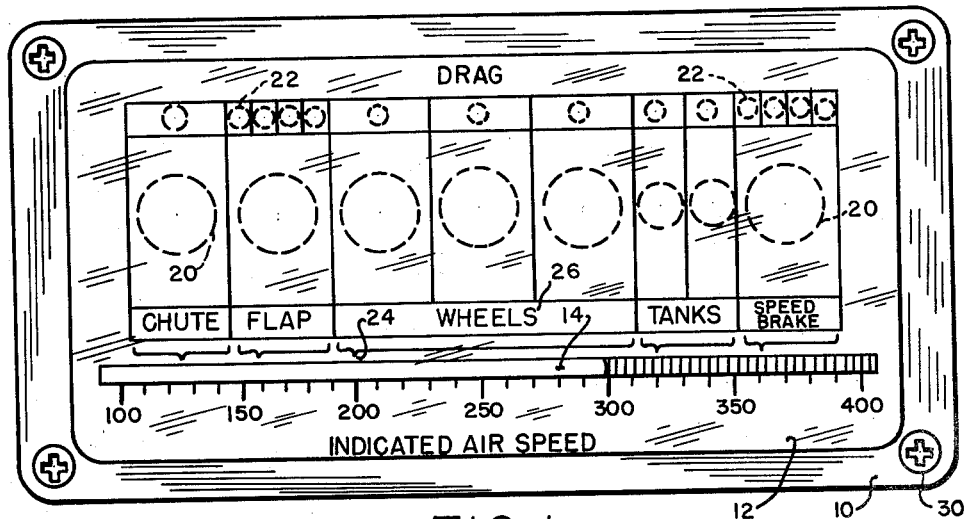
FIGURE 1 is a front view of the invention as it would appear mounted on the instrument panel in the cockpit of a plane with none of the drag elements operating.

In the preferred and illustrated embodiment of the invention, the numeral 10 indicates an enclosing casing of any suitable material, to which is affixed a translucent window 12 behind which silhouettes of drag elements 28 are placed. Compartments 16 contain bulbs 20 connected through wires 36 to switches on the controlled elements so that they light on operation of a drag element in a well known manner, as illustrated schematically in FIGURES 4 and 5.

FIGURE 4 illustrates the manner in which the bulbs 20 and bulbs 22 may be lighted as the landing wheels are lowered. As the wheels start down through the fuselage 50, a switch 48 makes contact with a switch contact 40 connecting a battery 38 through a wire 36 to the bulb 20. The bulb then lights to show a silhouette of a landing wheel. When the wheel is lowered and locked in landing position, the switch 48 completes a circuit through switch point 42, lighting bulb 22 and silhouetting the word "Safe" on the screen 12 above compartment 18. Bulb 20 remains connected in the circuit and continues lit. The same type of switch and the same sequence of contacts are connected when lowering the other wheels, in dropping the tanks and deploying a drag chute. In FIGURE 5 is shown a similar switch 48, which in sequence makes contact with four switch points, first with 40 lighting bulb 20, and showing that the control for the speed brake is working with the brake ¼ down, then with points 42, 44 and 46, lighting bulbs 22 in succession thereby showing that the brake is ½, ¾ and then fully down. A similar switch and sequence of operations applies to the flap and could be applied to any other drag element used in slowing a plane. Below each compartment 16 are words 26, always visible, describing the drag element in the compartment above such as "Flap," "Wheels," etc. Each compartment is bracketed, with an arrow 24, pointing to the criterion speed for each operation on an air speed indicator 14. Adjacent each compartment 16 are smaller compartments 18 each containing a bulb 22 with words or fractions 34 between the bulbs and the translucent window which become visible when the bulbs 22 light as the controlled elements reach positions such as "safe," "¼," "½," etc.

Figure 2:
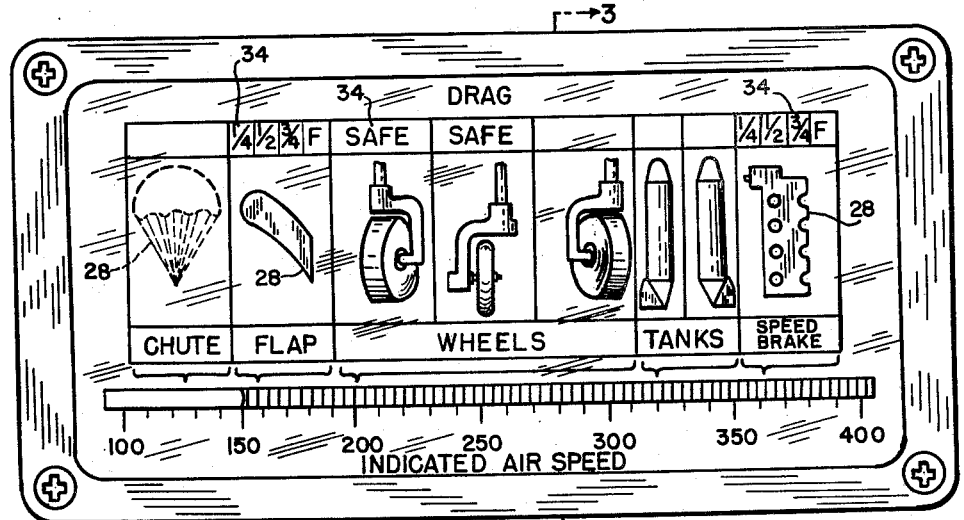
FIGURE 2 is a similar view showing how the invention would appear with the drag elements operating.
Figure 3:
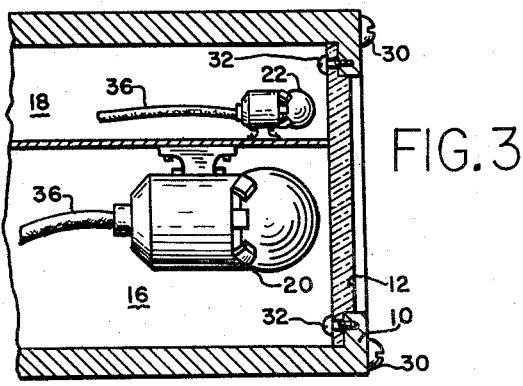
FIGURE 3 is a sectional view showing how the light bulbs are mounted in compartments behind the translucent window.

This display panel has been designed for a particular type of military plane with the critical, or criterion speeds for operation of the drag elements, as shown in FIGURE 2. For another plane the criterion speeds might be different. As the plane speed is reduced to 360 miles per hour, the speed brake control is operated and a picture of the speed brake in its compartment 16 becomes visible and as the brake is forced further into the airstream its position is recorded as "¼," "½," "¾," "F." As the speed approaches 320 miles per hour, the pilot operates the tank release control and as soon as the tanks are free the pictures of the tanks appear in tank compartment 16. As the speed of the plane is still further reduced and approaches 200 miles per hour, the control for extending the wheels to the landing position is operated and pictures of the three wheels appear. As the wheels lock in position the words "safe" appear above the wheel but in the illustration one of the wheels is not locked although the pilot knows it is down. Under such circumstances the pilot can continue efforts to lock the wheel or determine whether to make a landing with the wheel down but known to him to be in an unsafe condition. As the speed is further reduced to approximately 160 miles per hour, the control for letting down the flaps is operated and when they are down a picture of a flap appears in a compartment 16. As shown in FIGURE 2 the flaps have now been lowered to "F" position. If the plane is provided with a "brake chute" the pilot would operate its control at approximately 120 miles per hour and when the operation was complete a picture of the chute would appear.

The advantage of this concentration of related items in one instrument display where the relationship is emphasized and made obvious by pictures and reminders of the critical speed for each operation is helpful to pilots, especially in landing a plane. It is especially helpful to pilots of military planes where the pilot may be alone in the cockpit.

Modifications of the above preferred embodiment of this invention suggest themselves. For instance the compartments containing the pictures and the positions and conditions of each drag control indicator may be arranged in an arc of a circle around an air speed indicator with a circular dial instead of the linear graduated scale shown in the drawings.

Having thus described my invention what I claim as new and desire to secure by Letters Patent of the United States is:

1. A drag indicator for use in airplanes, comprising a casing having a translucent window therein, a linear speed indicator mounted adjacent to said window, a plurality of symbols of certain airplane elements mounted on said window, each of said symbols being positioned in a side by side relationship along the length of said linear speed indicator and adjacent to speed values on said indicator at which safe operation of an aircraft element represented by its symbol may be effected, an enclosure beneath each of said symbols, and means in each enclosure for illuminating said symbols when the operations represented thereby are successfully completed.

2. A drag indicator for use in airplanes comprising a casing having a translucent window therein, a linear air speed indicator mounted adjacent to said window, a plurality of symbols mounted in a side by side relationship on said window, said symbols representing various drag elements and being positioned adjacent to an indicated speed value on said speed indicator which is considered a safe speed at which to operate said elements, enclosure means beneath each of said symbols, and means in each of said enclosures arranged to illuminate said symbols when the operation indicated has been successfully completed.

3. A drag indicator for instrument panels in the cockpit of an airplane comprising, in combination, an enclosing casing, a translucent window in said casing, a plurality of compartments arranged in a side by side relationship behind said window each compartment having a symbol representing a drag element mounted on said window, illuminating means behind said symbol to silhouette said symbol when the operation of a drag element represented by said symbol is successfully completed, and a linear air speed indicator associated with the said casing and so positioned that the critical value of the speed for safe operation of each drag element is located below the symbol.

References Cited in the file of this patent

UNITED STATES PATENTS

| | | |
|---|---|---|
| 2,148,471 | Jones | Feb. 28, 1939 |
| 2,156,012 | Doyle | Apr. 25, 1939 |
| 2,262,756 | Clexton | Nov. 18, 1941 |
| 2,292,392 | Miller | Aug. 11, 1942 |
| 2,557,396 | Snell | June 19, 1951 |
| 2,738,491 | Mihalakis | Mar. 13, 1956 |

FOREIGN PATENTS

| | | |
|---|---|---|
| 519,523 | Great Britain | Mar. 29, 1940 |